(12) United States Patent
Marquette et al.

(10) Patent No.: US 9,217,870 B1
(45) Date of Patent: Dec. 22, 2015

(54) MAGNIFYING DEVICE AND METHOD

(71) Applicants: Grant N. Marquette, Clearwater, MN (US); Wayne C. Marquette, St. Michael, MN (US)

(72) Inventors: Grant N. Marquette, Clearwater, MN (US); Wayne C. Marquette, St. Michael, MN (US)

(*) Notice: Subject to any disclaimer, the term of this patent is extended or adjusted under 35 U.S.C. 154(b) by 0 days.

(21) Appl. No.: 14/616,326

(22) Filed: Feb. 6, 2015

(51) Int. Cl.
*G02B 27/02* (2006.01)
*G02B 25/00* (2006.01)

(52) U.S. Cl.
CPC ............ *G02B 27/025* (2013.01); *G02B 25/005* (2013.01)

(58) Field of Classification Search
USPC .................................................. 359/800–804
See application file for complete search history.

(56) References Cited

U.S. PATENT DOCUMENTS

| | | | | |
|---|---|---|---|---|
| 5,999,340 A | * | 12/1999 | Goff | G02B 25/02 359/804 |
| 2011/0318814 A1 | * | 12/2011 | Kshirsagar | C12M 47/04 435/239 |

* cited by examiner

*Primary Examiner* — Mohammed Hasan
(74) *Attorney, Agent, or Firm* — Dave Alan Lingbeck

(57) ABSTRACT

A magnifying device for magnifying selected objects for inspection in particular. The magnifying device includes a support assembly including a flexible and compressible tubular support having a length with open front and back ends and a bore extending therethrough; and a magnifying lens disposed in the bore proximate to the open front end of the tubular support and being maneuverable longitudinally and laterally relative to the back end to view an object in alignment with the open back end.

9 Claims, 4 Drawing Sheets

MAGNIFYING DEVICE AND METHOD

BACKGROUND OF THE INVENTION

1. Field of the Invention

The present invention relates to magnifiers and more particularly pertains to a new magnifying device for magnifying selected objects for inspection in particular.

2. Description of the Prior Art

The use of magnifiers is known in the prior art. More specifically, magnifiers heretofore devised and utilized are known to consist basically of familiar, expected and obvious structural configurations, notwithstanding the myriad of designs encompassed by the crowded prior art which have been developed for the fulfillment of countless objectives and requirements.

The prior art includes a fresnel magnifying lens card holder dimensioned to fit standardized cards, for example, all credit card sized cards. The card holder features a pair of parallel tracks and a raised narrow strip on a base plate. Another prior includes a coin holder having edge view optics. The coin holder includes a coin having an obverse side, a reverse side and a coin edge having features on the coin edge. Also another prior art includes a magnifier device for magnifying a portable video image produced by a video display device. The magnifier includes a base member connected a magnifier portion connected to and rotatable relative to the base member. Further, another prior art includes an adjustable magnifying attachment for a hand held implement is provided. The adjustable magnifying attachment includes a support base, an extension arm, a lens holder, and a magnifying lens. The support base has a hole and a slot, which is configured to receive a portion of the hand held implement and to secure the support base on the hand held implement. In addition, another prior art includes a modified magnifying glass with more than one clamps built on the bottom of the fixer of head magnifying glass. While these devices fulfill their respective, particular objectives and requirements, the aforementioned patents do not disclose a new magnifying device.

SUMMARY OF THE INVENTION

The general purpose of the present invention, which will be described subsequently in greater detail, is to provide a new magnifying device which has many of the advantages of the magnifiers mentioned heretofore and many novel features that result in a new magnifying device which is not anticipated, rendered obvious, suggested, or even implied by any of the prior art magnifiers, either alone or in any combination thereof. The present invention includes a support assembly including a flexible and compressible tubular support having a length with open front and back ends and a bore extending therethrough; and a magnifying lens disposed in the bore proximate to the open front end of the tubular support and being maneuverable longitudinally and laterally relative to the back end to view an object in alignment with the open back end. None of the prior art includes the combination of the elements of the present invention.

There has thus been outlined, rather broadly, the more important features of the magnifying device in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new magnifying device which has many of the advantages of the magnifiers mentioned heretofore and many novel features that result in a new magnifying device which is not anticipated, rendered obvious, suggested, or even implied by any of the prior art magnifiers, either alone or in any combination thereof.

Still another object of the present invention is to provide a new magnifying device for magnifying selected objects for inspection in particular.

Still yet another object of the present invention is to provide a new magnifying device that can be moved laterally and longitudinally or a combination thereof to magnify and view a selected object.

Even still another object of the present invention is to provide a new magnifying device that allows a user to insert a coin holder into a receiver to view a selected coin at various positions relative to the coin.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
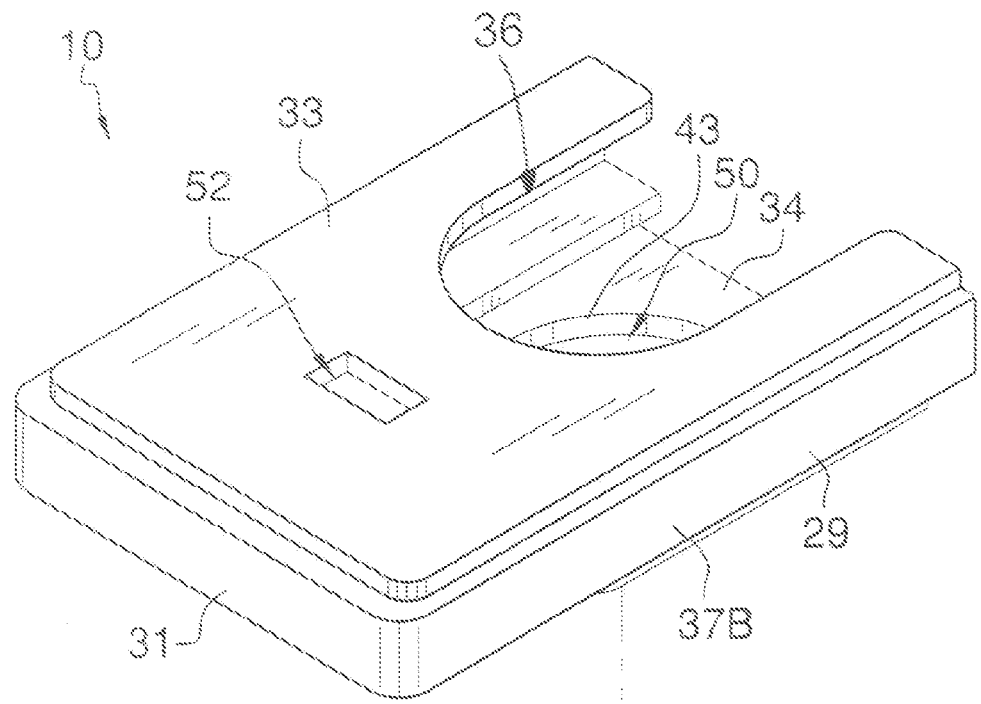
FIG. 1 is a bottom exploded perspective view of a new magnifying device according to the present invention with a cross-sectional view of the magnifier support.
Figure 1:
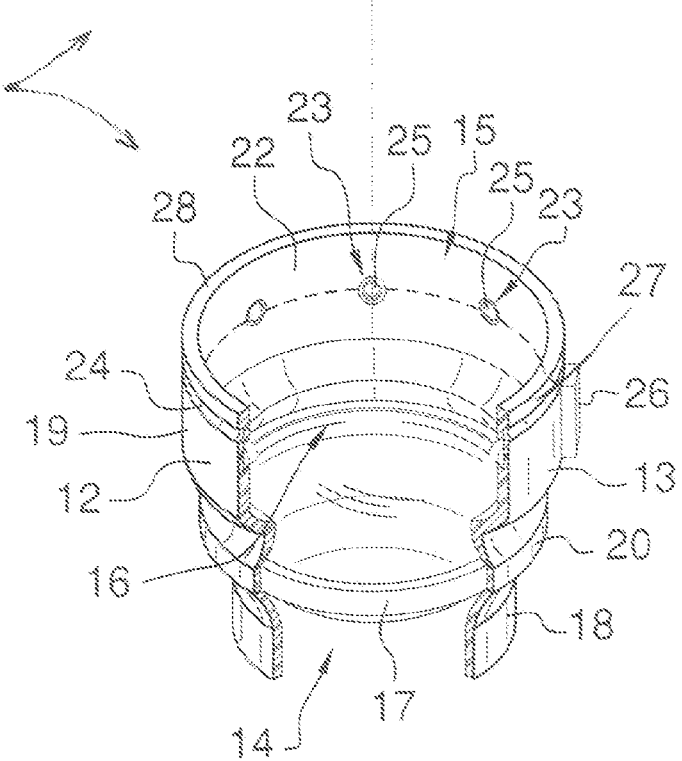
Figure 2:
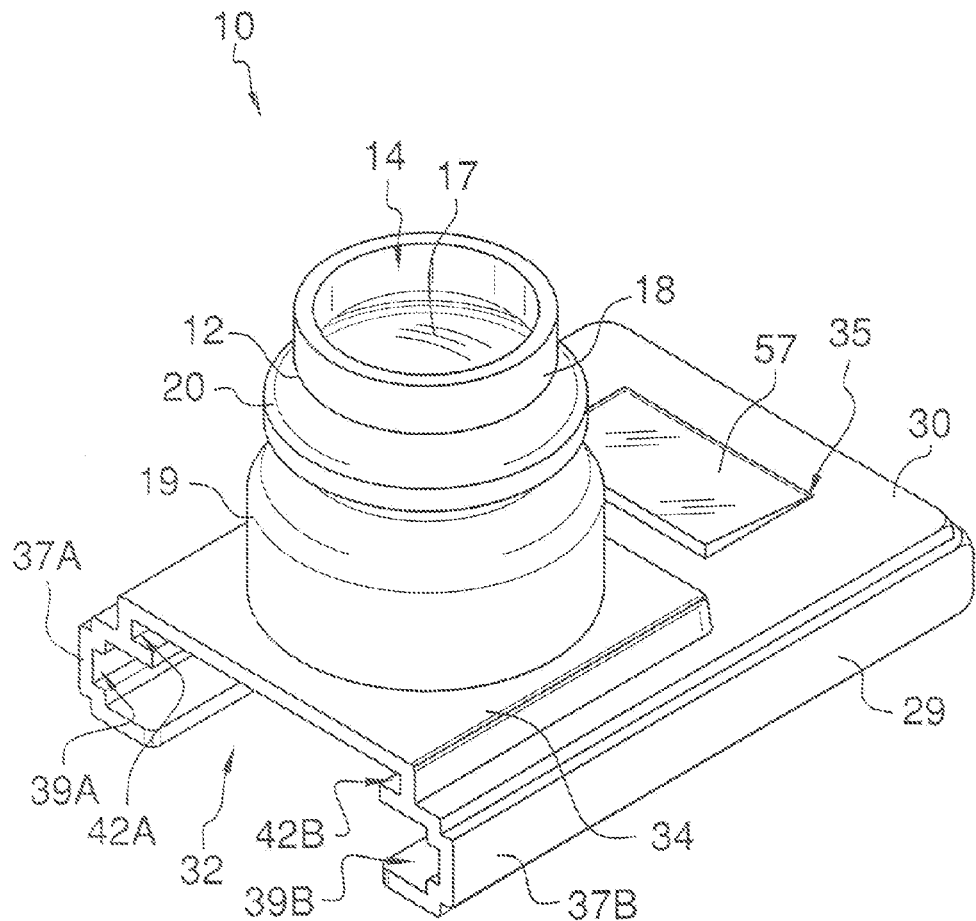
FIG. 2 is a top perspective view of the magnifying device.
Figure 3:
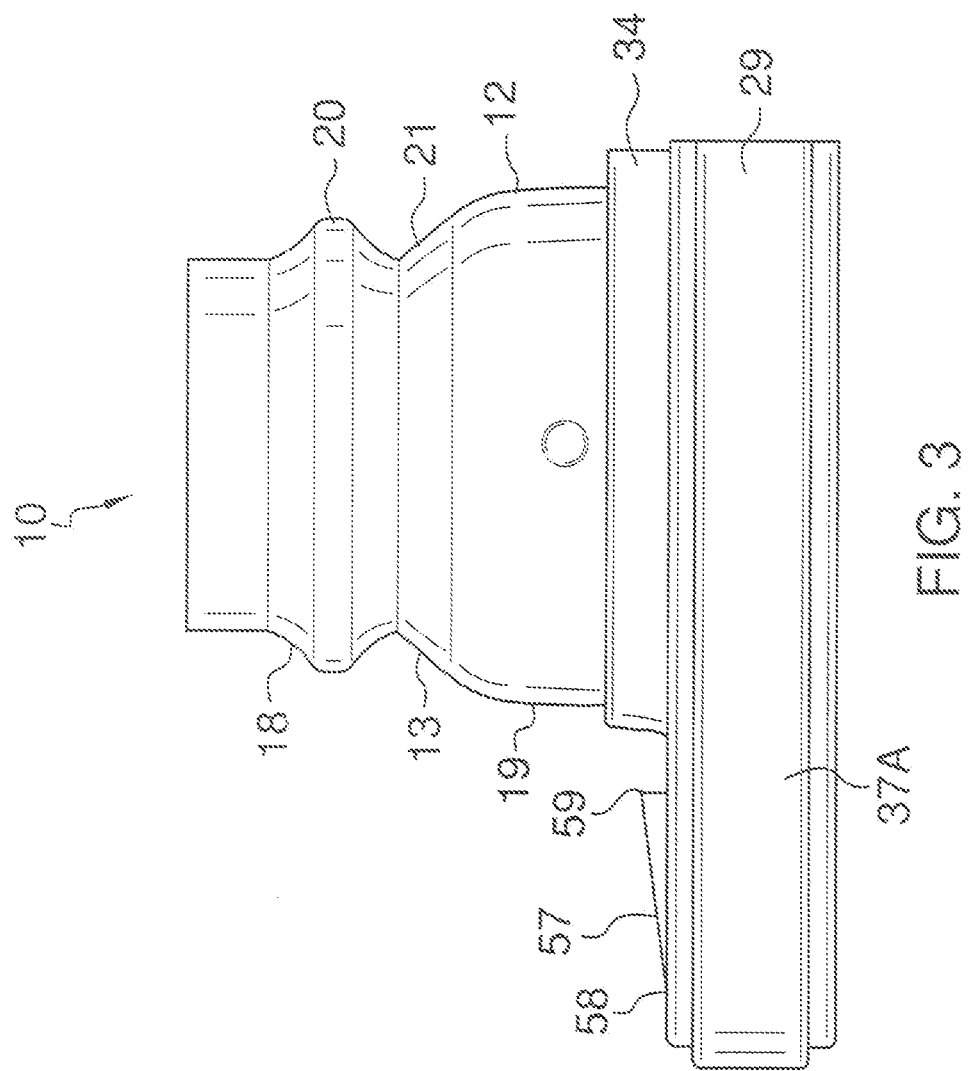
FIG. 3 is a side elevation view of the magnifying device.

With reference now to the drawings, and in particular to FIGS. 1 through 4 thereof, a new magnifying device embodying the principles and concepts of the present invention and generally designated by the reference numeral 10 will be described.

As best illustrated in FIGS. 1 through 4, the magnifying device 10 generally may comprise a support assembly 11 including a flexible and compressible tubular support 12 having a length with open front and back ends 14, 15 and a bore 16 extending therethrough; and a magnifying lens 17 disposed and conventionally secured in the bore 16 proximate to the open front end 14 of the tubular support 12 and being maneuverable longitudinally and laterally relative to the back end 15 to view an object 55, 56 in alignment with the open back end 15.

As shown in FIGS. 1-4, the tubular support 12 also may include a front portion 18, a back portion 19 and a side wall 13, wherein the side wall 13 includes at least one annular accordion fold 20 disposed outwardly of the side wall 13. The tubular support 12 is made of an elastic polymeric substance. The at least one annular accordion fold 20 is disposed in the front portion 18 with the front portion 18 being compressible longitudinally towards and into the back portion 19 and with the front portion 18 and magnifying lens 17 being maneuverable laterally to allow a user to magnify and view all about the object 55, 56. The at least one annular accordion fold 20 is an annular portion 20 of the side wall 13 which is outwardly bowed to facilitate longitudinal movement of the front portion 18 and magnifying lens 17 relative to the back portion 19 of the tubular support 12 to adjust the focus of the object 55, 56. The back portion 19 of the tubular support 12 is enlarged and has a circumference larger than that of the front portion 18 to allow the front portion 18 to be depressed longitudinally inside the back portion 19 when pressed upon. The side wall 13 may include slots 23 spacedly disposed in an inner side 22 in the back portion 19 and may also include an annular groove 24 disposed in an outer side 21 of the side wall 13 proximate to the open back end 15.

As shown in FIG. 1, the support assembly 11 may further include light-emitting diodes 25 conventionally disposed in the slots 23 for lighting up the object 55, 56 positioned at the open back end 15 of the tubular support 12 for a user to magnify and view through the magnifying lens 17 at the open front end 14 of the tubular support 12. The support assembly 11 may also include a power supply 26 such as a battery pack conventionally attached to the outer side 21 of the side wall 13 and in conventional communication using wires with the light-emitting diodes 25. The back portion 19 may further include a rigid back end portion 27 with a smooth non-stick outer edge 28 at the open back end 15 to facilitate moving the tubular support 12 upon any surface.

As shown in FIGS. 1-4, the support assembly may further include a rigid coin holder case 29 with a top wall 30, front wall 31, opposed side walls 37A&B, bottom wall 33 and an open back 32. The support assembly 11 may also include a boss 34 integrally disposed upon the top wall 30 with a bore 50 extending through the top wall 30 and the boss 34. The tubular support 12 is removably disposed in the bore 50 with the boss 34 having a portion 43 conventionally disposed about the bore 50 and removably received in the annular groove 24 to removably retain the tubular support 12 to the coin holder case 29 with the tubular support 12 extending outwardly from the boss 34. The coin holder case 29 may also have a first opening 35 disposed through the top wall 30 between the front wall 31 and the boas 34 and may also have a planar magnifying member 57 conventionally disposed in the second opening 35 with the planar magnifying member 57 tilted upwardly from a front 58 to a back 59 towards the boss 34 so that the user can view markings on a graded coin slab 55 removably disposed in the coin holder case 29.

Figure 4:
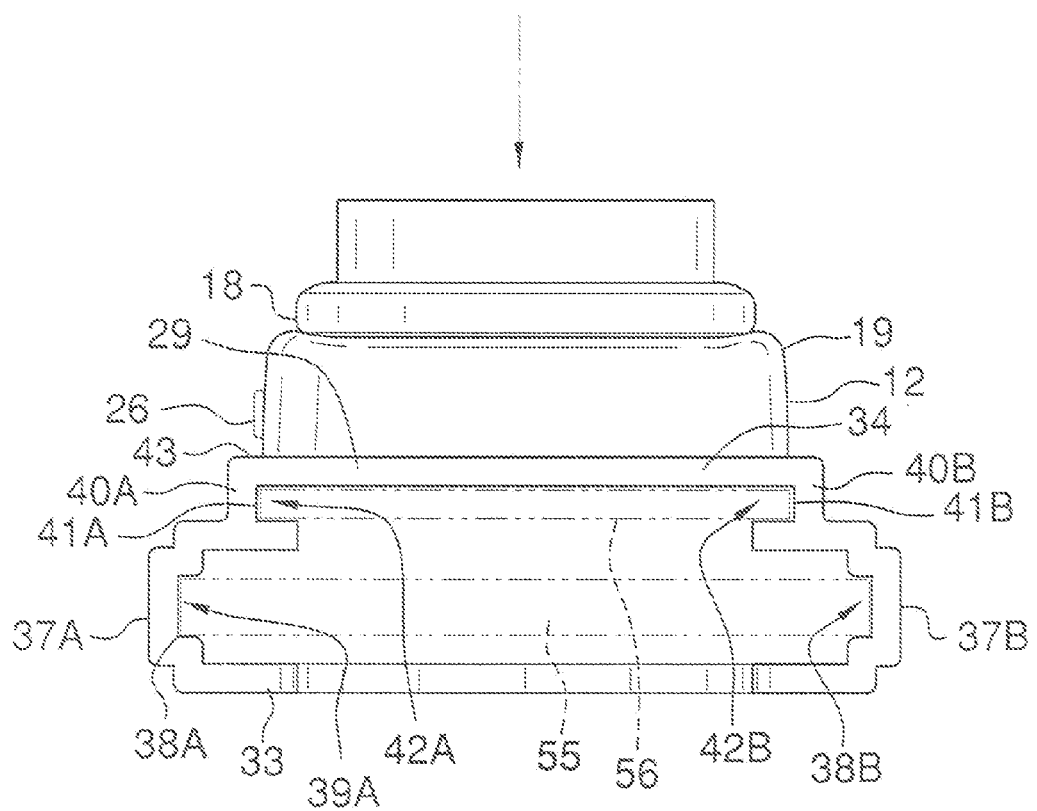
FIG. 4 is a front elevation view of the magnifying device with the magnifier support in a depressed position and with the dotted outlines of various coin holders in the coin receiver.

As shown in FIG. 4, the boss 34 has opposed side walls 40A&B with inner sides 41A&B defining the bore 50 through the boss 34 and further has longitudinal slots 42A&B each disposed on the inner side 41A&B of a respective side wall 37A&B of the boss 34 and extending a length of the boss 34 through the open back 32 of the coin holder case 29 for supporting small coin holders 56 under the tubular support 12 for viewing through the magnifying lens 17. The longitudinal slots 42A&B are aligned and separated from one another. The opposed side walls 37A&B of the coin holder case has inner sides 38A&B disposed inside the coin holder case 29 and having longitudinal grooves 39A&B each disposed on a respective inner side 38A&B and extending a length of the coin holder case 29 from the front wall 31 through the open back 32 for supporting large coin holders 55 under the tubular support 12 for viewing through the magnifying lens 17. The longitudinal grooves 39A&B are aligned and separated from one another. The longitudinal grooves 39A&B have a separation between one another larger than a separation between the longitudinal slots 42A&B to accommodate and receive the large coin holders 55 including coin slabs.

As further shown in FIG. 4, the bottom wall 33 of the coin holder case 29 may have a second opening 36 disposed therethrough and having a dimension larger than that of the bore with the bottom wall 33 being U-shaped to allow objects 55, 56 below the coin holder case 29 to be viewed through the magnifying lens 17. The bottom wall 33 may also have a hole 52 disposed therethrough for mounting to an elongate flexible stand.

In use, the front portion 18 of the tubular support 12 and the magnifying lens 17 may be maneuvered laterally and longitudinally for magnifying and viewing an object 55, 56 with the object 55, 56 positioned to that it can be magnified and viewed with the magnifying lens 17 through the tubular support 12. The tubular support 12 may be removably attached to the coin holder case 29. The object 55, 56 to be magnified and viewed may be inserted into the coin holder case 29. The object 55, 56 may be a coin in a coin holder. To acutely view the coin for example, the front portion 18 of the tubular support 12 and the magnifying lens 17 may be maneuvered longitudinally and laterally to focus and enlarge the coin as viewed through the magnifying lens 17. After viewing the coin, the coin holder 55, 56 may be removed from the coin holder case 29.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the magnifying device. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:
1. A magnifying device comprising:
a support assembly including a flexible compressible and collapsible tubular support having a length with open front and back ends and a bore extending therethrough, wherein the tubular support also includes a front portion, a back portion and a side wall, wherein the back portion of the tubular support is enlarged relative to that of the front portion to allow the front portion to be depressed longitudinally inside the back portion when pressed upon; and a magnifying lens disposed in the bore of the tubular support and being maneuverable longitudinally and laterally relative to the back end to view an object in alignment with the open back end and to maintain parallelism with the object.

2. The magnifying device as described in claim 1, wherein the side wall includes slots spacedly disposed in an inner side of the side wall in the back portion of the tubular support.

3. The magnifying device as described in claim 2, wherein the support assembly further includes light-emitting diodes disposed in the slots for lighting up the object disposed at the open back end of the tubular support for a user to view through the magnifying lens at the open front end of the tubular support, wherein the support assembly also includes a power supply attached to the outer side the side wall and in communication with the light-emitting diodes.

4. The magnifying device as described in claim 1, wherein the support assembly further includes a rigid coin holder case with a top wall, front wall, opposed side walls, bottom wall and an open back, wherein the support assembly also includes a boss disposed upon the top wall with a bore extending through the top wall and the boss.

5. The magnifying device as described in claim 4, wherein the tubular support is removably disposed in the bore with the boss having a portion disposed about the bore with the tubular support extending outwardly from the boss.

6. The magnifying device as described in claim 4, wherein the coin holder case also has a first opening disposed through the top wall between the front wall and the boss and also has a planar magnifying member disposed in the second opening with the planar magnifying member tilted upwardly from a front to a back towards the boss so that the user can view markings on a graded coin slab removably disposed in the coin holder case.

7. The magnifying device as described in claim 4, wherein the boss has opposed side walls with inner sides defining the bore through the boss and further has longitudinal slots each disposed on the inner side of a respective said side wall of the boss and extending a length of the boss through the open back of the coin holder case for supporting small coin holders under the tubular support for viewing through the magnifying lens, wherein the longitudinal slots are aligned and separated from one another.

8. The magnifying device as described in claim 7, wherein the opposed side walls of the coin holder case has inner sides disposed inside the coin holder case and having longitudinal grooves each disposed on a respective said inner side and extending a length of the coin holder case from the front wall through the open back for supporting large coin holders under the tubular support for viewing through the magnifying lens, wherein the longitudinal grooves are aligned and separated from one another.

9. The magnifying device as described in claim 8, wherein the longitudinal grooves have a separation between one another larger than a separation between the longitudinal slots to accommodate and receive the large coin holders including coin holder slabs.

\* \* \* \* \*